Oct. 17, 1961  E. WIEDEMANN  3,004,466
OPTICAL APPARATUS WITH PHASE PLATE FOR THE PRODUCTION
OF THE FIRST DERIVATIVES OF REFRACTIVE
INDEX GRADIENTS AND A ZERO LINE
Filed June 30, 1958  4 Sheets-Sheet 1
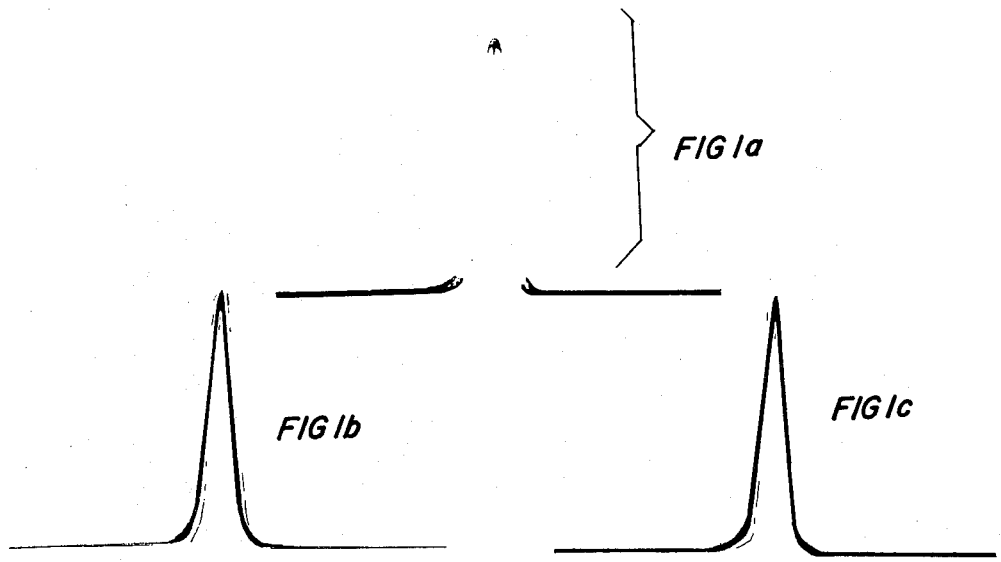
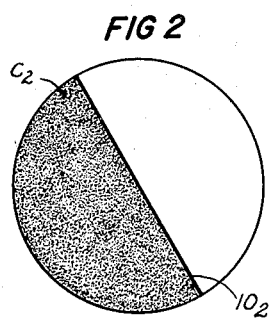
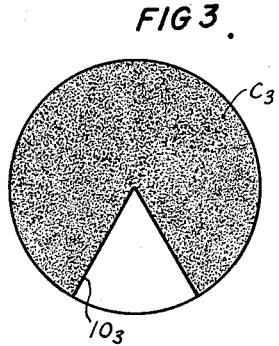
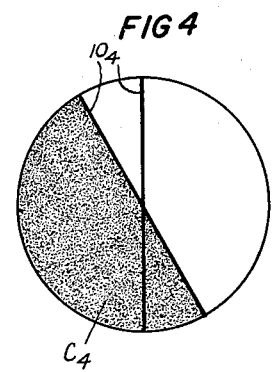
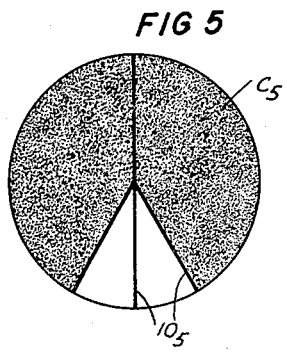
INVENTOR
Erwin Wiedemann
BY Wenderoth, Lind & Ponack
ATTORNEYS Oct. 17, 1961 E. WIEDEMANN 3,004,466
OPTICAL APPARATUS WITH PHASE PLATE FOR THE PRODUCTION
OF THE FIRST DERIVATIVES OF REFRACTIVE
INDEX GRADIENTS AND A ZERO LINE
Filed June 30, 1958 4 Sheets-Sheet 3

INVENTOR
*Erwin Wiedemann*

BY Wenderoth, Lind and Ponack
ATTORNEYS

Oct. 17, 1961 E. WIEDEMANN 3,004,466
OPTICAL APPARATUS WITH PHASE PLATE FOR THE PRODUCTION
OF THE FIRST DERIVATIVES OF REFRACTIVE
INDEX GRADIENTS AND A ZERO LINE
Filed June 30, 1958 4 Sheets-Sheet 4

Inventor

*Erwin Wiedemann* by Wenderoth, Lind &d Ponack
Attorneys

United States Patent Office 3,004,466
Patented Oct. 17, 1961

3,004,466
OPTICAL APPARATUS WITH PHASE PLATE FOR THE PRODUCTION OF THE FIRST DERIVATIVES OF REFRACTIVE INDEX GRADIENTS AND A ZERO LINE
Erwin Wiedemann, Riehen, near Basel, Switzerland, assignor to Sandoz Ltd., Basel, Switzerland
Filed June 30, 1958, Ser. No. 745,340
Claims priority, application Switzerland July 5, 1957
11 Claims. (Cl. 88—14)

The present invention relates to an apparatus for the production of the first derivative of refractive index gradients and a zero line, i.e. the $$\frac{dn}{dx}/x \text{ values}$$

of refractive index gradients relative to a constant zero value, which arise on the frontiers between liquids of different refractive indices, comprising a source of light, optical means for directing said light through the liquids, a surface on which the representations of the derivative of the refractive index gradients and the zero line can be produced, and in which apparatus the conventional means for producing the image, such as diagonal slits, blades or wires are replaced by a phase plate for producing the first derivatives of refractive index gradients and a zero line, i.e. the $$\frac{dn}{dx}/x \text{ values}$$

of refractive index gradients relative to a constant zero value, which arise on the boundaries between liquids of different refractive indices, which values can be represented in a form suitable for reproduction by known optical systems. This phase plate consists of an optically flat transparent plate partially covered with a coating which will change the phase of light passing therethrough by $\lambda/2$ relative to the light passing through the uncoated part of the plate, and also has thereon a light impervious line having a width of from 10 to $50\mu$, the longitudinal center of said line coinciding with the edge of the coating and being in the same plane therewith. The phase plate may further have thereon at least one additional light impervious line having a width of from 10 to $50\mu$ which crosses the edge of the coating and the line at an angle up to 90° relative to the edge, the additional line being in the same plane as the coating.

It has been known heretofore from the literature on the subject that for the production of the $$\frac{dn}{dx}/x \text{ values}$$

an oblique wire can be used instead of an oblique slit or an oblique edge (see f.i. H. Svensson, Koll. Z. 87, 181 (1939); 90, 141 (1940); E. Wiedemann, in: Hoppe-Seyler/Thierfelder, vol. I, p. 70–71, Springer-Verlag, Berlin, Göttingen, Heidelberg 1953, wherein illustrations of the course of rays are shown). One con consider that in this instance the wire is a "negative slit," since one thereby obtains the $$\frac{dn}{dx}/x \text{ values}$$

as a dark line on a bright background.

One can replace (see f.i. H. Wolter, Ann. Physik 7, 341 (1950); W. Kossel and K. Strohmaier, Z. Naturf. 6a, 504 (1951) the oblique wire by the oblique edge of the $\lambda/2$ coating on an optically flat transparent plate and thereby obtain the same $$\frac{dn}{dx}/x \text{ values}$$

as are obtained by using a dark line on a bright background (see also O. Armbruster, W. Kossel and K. Strohmaier, Z. Naturf. 6a, 510 (1951).

A close examination of the production of the $$\frac{dn}{dx}/x \text{ values}$$

obtained by means of the oblique edge of a $\lambda/2$ coating on the one hand and by means of an oblique wire on the other hand shows that neither the one nor the other of the respective images obtained in these ways are satisfactory as to the requirements for reproduction of the entire first derivatives of refractive index gradients as fine, sharp lines throughout. Moreover, a contrast results insofar as the wire image becomes more blurred the greater the change of refractive index, and the phase plate image according to the literature cited becomes less visible and definite the smaller the change of refractive index.

It is an object of the present invention to provide an apparatus with a special phase plate which combines a phase plate and a $\lambda/2$ phase coating having an oblique edge, with an oblique wire in such a manner and having such dimensions that the above mentioned disadvantages of the separate images will disappear and a clear and sharp image of the whole course of the change of refractive index will result.

These and further objects of the present invention will become apparent from the following description and the appended claims together with the accompanying drawings in which:

FIG. 1a is the image of the derivative of the refractive index gradient (diffusion gradient) produced by the use of a wire $40\mu$ in width;

FIG. 1b is the image of the derivative of the refractive index gradient (same diffusion gradient) produced by the use of a phase plate according to the literature cited having a $\lambda/2$ coating with an oblique edge;

FIG. 1c is the image of the derivative of the refractive index gradient (same diffusion gradient) produced by the use of a special phase plate according to the present invention;

FIG. 2 is a phase plate for use in the apparatus according to the present invention;

FIG. 3 is a modification of the phase plate for use in the apparatus according to the present invention;

FIG. 4 is a further modification of the phase plate for use in the apparatus according to the present invention;

FIG. 5 is a further modification of the phase plate for use in the apparatus according to the present invention;

Figure 8:
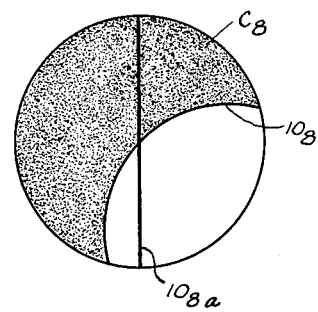
Figure 9:
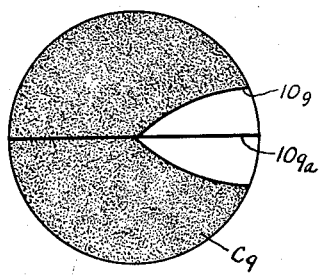
Figure 10:
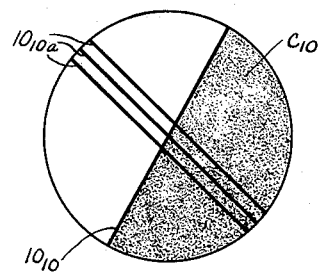
Figure 11:
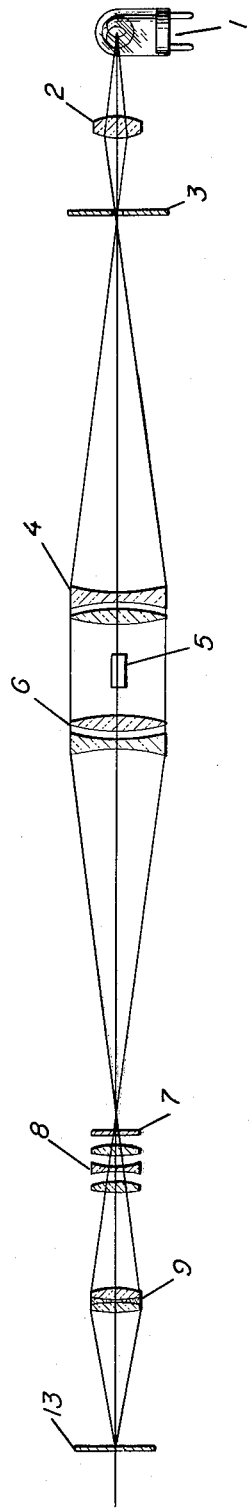
Figure 12:
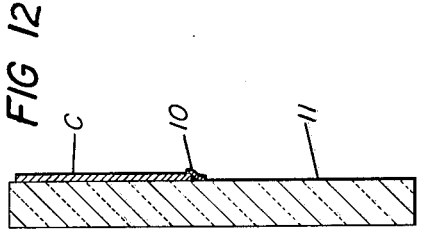

FIGS. 8, 9 and 10 are further modifications of the phase plate for use in the apparatus according to the present invention, FIG. 11 is a schematic view of a refractive index gradient apparatus partly in section, showing where in such an apparatus a phase plate is used; and FIG. 12 is a sectional view of a phase plate, the scale having been exaggerated to illustrate the positioning of the coating thereon.

The refractive index gradient apparatus in which the phase plate according to the invention is used comprises a source of light 1 the light from which is directed through a condenser lens 2 which condenses the light source so as to pass it through a horizontal slit in plate 3. A first collimator lens 4 causes the light to pass with the rays thereof parallel through a glass container 5 and through a second collimator lens 6. The light 7 converges at a plate 7, and the light which passes through the phase plate is then passed through a spherical objective 8 and a cylinder objective 9 which has a vertical axis, the light then falls on a light receiving surface, which may be a ground glass plate or a plate having a photosensitive coating thereon. This apparatus is a well-known device, the phase plate being substituted for a wire or a phase plate having merely a face coating thereon.

It appears that all occurring values of the first derivative of refractive index gradients reproduced by means of the phase plate according to the present invention are recorded with the same sharpness, brilliancy and definition, and that they are undisturbed by blurring and diffraction effects, when:

(1) The two image producing elements, namely the oblique wire and the oblique edge of a $\lambda/2$ coating, coincide in the same plane perpendicular to the optical axis of these elements (which coincides in principle with the direction of light passing through or by them) and when:

(2) The oblique wire, in this case replaced by a line impervious to light, has a width of from 10 to $50\mu$.

This may be provided by comparison of FIG. 1a, FIG. 1b and FIG. 1c. FIG. 1a is an image, enlarged three times, of the derivative of the refractive index gradient as produced in a difusion experiment, recorded by the use of a wire of $40\mu$ width; FIG. 1b is an image of the same derivative, but recorded by the use of a phase plate according to the literature having a $\lambda/2$ coating with an oblique edge; FIG. 1c, finally, is an image of the same derivative, but recorded by the use of the phase plate according to the present invention characterized by the coincidence of the oblique edge of the $\lambda/2$ coating and an impervious line of $40\mu$ width. FIG. 1c combines the advantages of FIG. 1a and FIG. 1b without their disadvatages. FIG. 1c is free of blurring effects and diffraction disturbances and shows the gradient curve regardless of its inclination as a fine clear line throughout. The same is true for the images of FIGS. 6a, 6b and 6c which were also recorded by means of the phase plate according to the present invention.

Figure 6A:
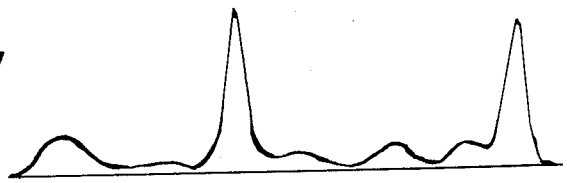
FIG. 6a is the image of the derivative of a series of refractive index gradients (an electrophoresis diagram with a base line) produced by means of a phase plate as shown in FIG. 4 when used in the apparatus according to the present invention.
Figure 6B:
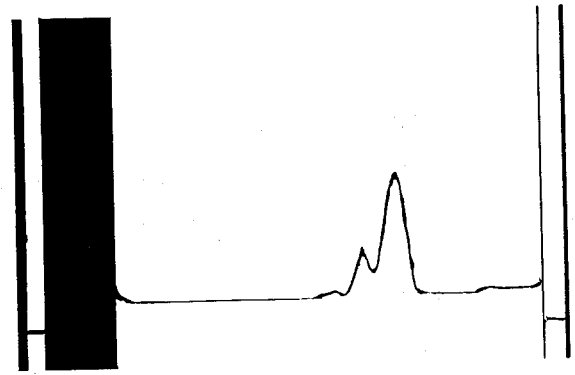
FIG. 6b is the image of the derivative of a series of refractive index gradients (an ultracentrifuge diagram) produced by means of a phase plate as shown in FIG. 2 when used in the apparatus according to the present invention.
Figure 6C:
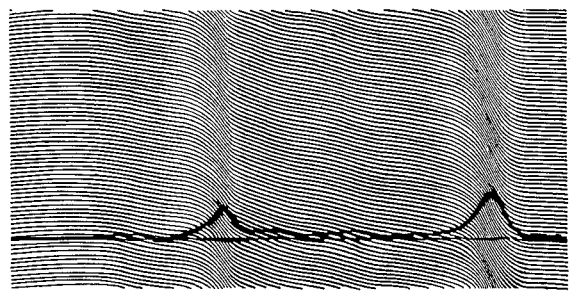
FIG. 6c is the image of a simultaneous record of a series of refractive index gradients as obtained by Rayleigh interferometry (interference lines) and of the derivative as obtained by means of a phase plate as shown in FIG. 4 when used in the apparatus according to the present invention.

In order to produce the new phase plate with which the images of FIG. 1c and of FIGS. 6a, 6b and 6c were taken, an optically flat transparent plate, e.g. of glass or quartz, in which the deviations from flatness over the area of the plate are less than $\lambda/4$, is partially covered with a coating in the form of a thin layer of a suitable material such as $SiO_2$ or the like, the thickness of which is chosen so that by passing through the coated part of the plate the light to be used, the phase of the light will be changed by $\lambda/2$ relative to the phase of light passed through the uncovered part of the plate. The edge of the coating is covered with a light impervious line 10 of from 10 to $50\mu$ width, the longitudinal center line of the impervious line coinciding with the edge of the opening. An equivalent result is achieved when the reverse sequence is followed, namely the application of a light impervious line of $10-50\mu$ width on a flat transparent plate and a subsequent coating with a $\lambda/2$ layer, in such a way that the edge of the coating coincides with the center of the impervious line.

Usually, the image producing means is a straight line $10_2$ as shown in FIG. 2. However, according to the present invention, other forms are possible, such as open or closed curves, angled straight lines or combinations thereof, of which the line $10_3$ along the edge of coating $C_3$ of the phase plate of FIG. 3 is an example. Furthermore, the new phase plate can be provided with additional light impervious lines of desired form with a width preferably from 10 to $50\mu$. The phase plates of FIGS. 4 and 5 illustrate two examples of combinations of coatings $C_4$ and $C_5$ and lines $10_4$ and $10_5$ in which additional lines are provided.

Figure 7:
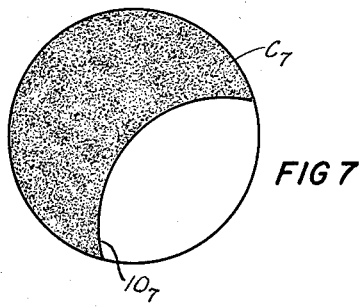
FIG. 7 is a further modification of the phase plate for use in the apparatus according to the present invention.

FIG. 7 is an illustration of a phase plate similar to that shown in FIG. 2 in which the edge of the coating $C_7$ and the light impervious line $10_7$ are curved rather than straight.

FIG. 8 is an illustration of a phase plate similar to that of FIG. 4 in which the edge of the coating $C_8$ and the light impervious line $10_8$ are curved, and the additional line $10_{8a}$ causing them is straight.

FIG. 9 is an illustration of a phase plate similar to that of FIG. 5 in which the edge of the coating $C_9$ and the light impervious line $10_9$ are broken curves, and the additional line $10_{9a}$ intersects the edge of the coating $C_9$ and the light impervious line $10_9$ at the break.

FIG. 10 is an illustration of a phase plate in which there are a plurality of additional lines $10_{10a}$ intersecting the edge of the coating $C_{10}$ and the light impervious line $10_{10}$ coinciding therewith at equal angles, the additional lines $10_{10a}$ being parallel to each other.

Such embodiments of the phase plate for use in the apparatus according to the present invention have a practical importance for special purposes. The embodiment shown in FIG. 4 is used, for instance, in electrophoresis work, there providing records containing the base line as shown in FIG. 6a. The principal embodiment, as shown in FIG. 2 is used, for instance, in ultracentrifuge work, there providing records as shown in FIG. 6b. The embodiment according to FIGS. 5 and 6 are used to produce homologous double-curve pictures with or without a base line, while curvatures of the image producing lines permit introduction of predetermined scale changes.

The images taken from an apparatus with the above described phase plates are superior to those obtainable at present in that the regions at which the change of the index of refraction is small or zero, as well as those regions at which the change of the index of refraction is great or even infinite, are reproduced with equal clarity and sharpness and are undisturbed by blurrings or diffraction effects. This is seen in the reproductions of FIGS. 6a and 6b especially. The revolving power of the records made with the phase plate according to the present invention is, therefore, about ten times greater than the resolving power of the records available by the diagram methods hitherto known.

As the apparatus with the new type of phase plate can be given a large aperture, which can not be done with an oblique slit for instance, it is possible to take simultaneous and coinciding $$n/x\text{- and }\frac{dn}{dx}/x\text{-records}$$

by the use of Rayleigh interferometry and a phase plate respectively. The idea of taking these simultaneous records is described in the literature (D. H. Moore and K. Opperman, Biochem. et Biophys. Acta 22, 136 (1956);

D. H. Moore, Biochem. et Biophys. Acta 22, 141 (1956), but, as the phase plate according to the present invention was not yet known when these articles were written, the diagrams published there do not show a sufficient reproduction of the regions where the change of the index of refraction is small or zero. As shown in FIG. 6c, this disadvantage will be eliminated by the use of an apparatus with the phase plate according to the present invention. An apparatus with the new type of phase plate may be used, therefore, for simultaneous records too, where it also gives better definition.

I claim:

1. An apparatus for the production of the first derivative of refractive index gradients and a zero line, i.e. the $$\frac{dn}{dx}/x \text{ values}$$

of refractive index gradients relative to a constant zero value, which arise on the frontiers between liquids of different refractive indices, comprising a source of light, optical means for directing said light through the liquids, a surface on which the representation of the derivative of the refractive index gradients and the zero line can be produced, and means for producing the image, comprising a phase plate between the liquids and the surface, said phase plate consisting of an optically flat transparent plate, a coating on said plate partially covering said plate and being of a material which will change the phase of light passing therethrough by $\gamma/2$ relative to the light passing through the uncovered part of said plate, a light impervious line on said plate having a width of from 10 to $50\mu$, the longitudinal center of said line coinciding with the edge of said coating and said line being in the same plane as said coating, said plate further having at least one additional light impervious line therein having a width of from 10 to $50\mu$, said additional line crossing the edge of said coating at an angle up to 90° relative thereto and this line being in the same plane as said coating.

2. An apparatus as claimed in claim 1 in which said edge of the coating and the line coinciding with it and said additional line are straight and cross each other near the center of the plate.

3. An apparatus as claimed in claim 1 in which said edge of the coating and the line coinciding with it are broken and have straight parts, said additional line crossing said edge and said line coinciding therewith at the break therein.

4. An apparatus as claimed in claim 3 in which the said additional line bisects the angle formed by the break in the edge of the coating and the line coinciding with it.

5. An apparatus as claimed in claim 1 in which the edge of the coating and said line coinciding with it are curved, and the said additional line crossing them is straight.

6. An apparatus as claimed in claim 5 in which the said additional line divides the said edge and the said line coinciding with it into two symmetrical parts.

7. An apparatus as claimed in claim 1 which the said edge of the coating and the said line coinciding with it are broken curves and the said additional line crosses said edge and said line at the break therein.

8. An apparatus for the production of the first derivative of refractive index gradients and a zero line, i.e. the $$\frac{dn}{dx}/x \text{ values}$$

of refractive index gradients relative to a constant zero value, which arise on the frontiers between liquids of different refractive indices, comprising a source of light, optical means for directing said light through the liquids, a surface on which the representation of the derivative of the refractive index gradients and the zero line can be produced, and means for producing the image, comprising a phase plate between the liquids and the surface, said phase plate consisting of an optically flat transparent plate, a coating on said plate partially covering said plate and being of a material which will change the phase of light passing therethrough by $\gamma/2$ relative to the light passing through the uncovered part of said plate, a light impervious line on said plate having a width of from 10 to $50\mu$, the longitudinal center of said line coinciding with the edge of said coating and said line being in the same plane as said coating.

9. An apparatus as claimed in claim 8 in which said edge of the coating and the line coinciding with it are straight.

10. An apparatus as claimed in claim 8 in which said edge of the coating and the line coinciding with it are curved.

11. An apparatus for the production of the first derivative of refractive index gradients and a zero line, i.e. the $$\frac{dn}{dx}/x \text{ values}$$

of refractive index gradients relative to a constant zero value, which arise on the frontiers between liquids of different refractive indices, comprising a source of light, optical means for directing said light through the liquids, a surface on which the representation of the derivative of the refractive index gradients and the zero line can be produced, and means for producing the image, comprising a phase plate between the liquids and the surface, said phase plate consisting of an optically flat transparent plate, a coating on said plate partially covering said plate and being of a material which will change the phase of light passing therethrough by $\gamma/2$ relative to the light passing through the uncovered part of said plate, a light impervious line on said plate having a width of from 10 to $50\mu$, the longitudinal center of said line coinciding with the edge of said coating and said line being in the same plane as said coating, said plate further having a plurality of parallel additional light impervious lines thereon having a width of from 10 to $50\mu$, said additional lines crossing the edge of said coating at an angle up to 90° relative thereto and the line being in the same plane as said coating.

References Cited in the file of this patent
UNITED STATES PATENTS

| | | |
|---|---|---|
| 2,809,551 | Svensson | Oct. 15, 1957 |
| 2,850,940 | Opperman | Sept. 9, 1958 |

FOREIGN PATENTS

| | | |
|---|---|---|
| 819,925 | Germany | Nov. 5, 1951 |